United States Patent
Hata et al.

(10) Patent No.: US 9,467,586 B2
(45) Date of Patent: Oct. 11, 2016

(54) IMAGE FORMING APPARATUS

(71) Applicant: CANON KABUSHIKI KAISHA, Tokyo (JP)

(72) Inventors: Yousuke Hata, Ichikawa (JP); Toshifumi Kakutani, Abiko (JP); Takeyuki Suda, Nagareyama (JP); Hirohisa Nakajima, Tsukubamirai (JP); Shinya Suzuki, Toride (JP); Manabu Koseki, Sakuragawa (JP); Toshiyuki Abe, Toride (JP); Takayuki Iikura, Kashiwa (JP); Kazunori Miyake, Abiko (JP); Shuji Obata, Noda (JP); Mitsuhiro Sugeta, Abiko (JP); Kazumi Sato, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/953,650

(22) Filed: Nov. 30, 2015

(65) Prior Publication Data

US 2016/0165086 A1    Jun. 9, 2016

(30) Foreign Application Priority Data

Dec. 8, 2014   (JP) .................................. 2014-248182

(51) Int. Cl.
*G03G 15/00*  (2006.01)
*G03G 21/14*  (2006.01)
(Continued)

(52) U.S. Cl.
CPC .......... *H04N 1/00891* (2013.01); *G06K 15/02* (2013.01); *H04N 1/0032* (2013.01);
(Continued)

(58) Field of Classification Search
CPC ...... G03G 15/00; G03G 21/00; G03G 21/14; B04N 1/00551; B04N 1/00037; B04N 1/00734; H04N 1/00713; H04N 1/0032; H04N 1/00891; H04N 1/00901; G06K 15/02
See application file for complete search history.

(56) References Cited

U.S. PATENT DOCUMENTS 5,172,138 A   12/1992  Okazawa et al.
5,196,885 A    3/1993  Takeuchi et al.
(Continued)

FOREIGN PATENT DOCUMENTS

JP   61284780 A  * 12/1986  ............. G03G 21/00
JP   08063075 A  *  3/1996  ............. G03G 21/14
(Continued)

OTHER PUBLICATIONS

Office Action issued in corresponding UK Patent Application No. GB1521436.4, dated Jun. 8, 2016.

*Primary Examiner* — Nguyen Ha
(74) *Attorney, Agent, or Firm* — Fitzpatrick, Cella, Harper & Scinto (57) ABSTRACT

An image forming apparatus which can control to turn on/off a light emitting element depending on a sheet state on a manual sheet tray is provided. The image forming apparatus includes the manual feed tray on which the sheet is placed. The image forming apparatus is configured to be switchable between normal power mode and power saving mode. In the normal power mode, normal power is supplied. In the power saving mode, less power is consumed as compared to the power consumed in the normal power mode. The image forming apparatus includes a manual sheet feeding sensor which detects presence/absence of the sheet on the manual feed tray. The image forming apparatus includes a sheet length sensor S and a sheet length sensor L which include the light emitting element and a light receiving element to detect approximate sheet length of sheet placed on the manual feed tray in a conveying direction.

11 Claims, 7 Drawing Sheets

(51) Int. Cl.
*H04N 1/00* (2006.01)
*G06K 15/02* (2006.01)

(52) U.S. Cl.
CPC ...... *H04N1/00037* (2013.01); *H04N 1/00551* (2013.01); *H04N 1/00713* (2013.01); *H04N 1/00734* (2013.01); *H04N 1/00901* (2013.01)

(56) References Cited

U.S. PATENT DOCUMENTS

| | | | |
|---|---|---|---|
| 5,303,015 | A | 4/1994 | Sato |
| 5,305,995 | A | 4/1994 | Nakajima et al. |
| 5,334,817 | A | 8/1994 | Nakamori et al. |
| 5,450,170 | A | 9/1995 | Kimizuka et al. |
| 5,481,336 | A | 1/1996 | Tachibana et al. |
| 5,775,823 | A | 7/1998 | Bekki et al. |
| 5,815,786 | A * | 9/1998 | Isemura ............. G03G 15/5095 399/370 |
| 5,819,134 | A | 10/1998 | Sato et al. |
| 5,875,373 | A | 2/1999 | Sato et al. |
| 6,008,829 | A | 12/1999 | Wakamiya et al. |
| 6,438,333 | B1 | 8/2002 | Katsumi et al. |
| 6,449,445 | B1 | 9/2002 | Nakamori et al. |
| 7,321,738 | B2 | 1/2008 | Kaji et al. |
| 7,599,636 | B2 | 10/2009 | Kaji et al. |
| 2002/0127037 | A1* | 9/2002 | Fujii ........................ B65H 7/02 399/371 |
| 2003/0184814 | A1* | 10/2003 | Hashizume ........ H04N 1/00708 358/437 |
| 2005/0129436 | A1* | 6/2005 | Kohchi .................. G03B 27/62 399/376 |
| 2006/0171726 | A1* | 8/2006 | Noda ................. G03G 15/5016 399/16 |
| 2007/0146818 | A1* | 6/2007 | Horiguchi .......... H04N 1/00681 358/474 |
| 2009/0244649 | A1* | 10/2009 | Shinkawa ............ H04N 1/0071 358/474 |
| 2012/0002247 | A1* | 1/2012 | Hashizume ........ H04N 1/00689 358/475 |
| 2014/0153013 | A1 | 6/2014 | Imamura |
| 2015/0195417 | A1* | 7/2015 | Ohhashi ............... H04N 1/0049 358/1.14 |

FOREIGN PATENT DOCUMENTS

| | | |
|---|---|---|
| JP | 2003-182886 A | 7/2003 |
| JP | 2006-326861 A | 12/2006 |

* cited by examiner

| SIZE | SHEET WIDTH SENSOR | | | SHEET LENGTH SENSOR | |
|---|---|---|---|---|---|
| | LOWER LIMIT VALUE | NOMINAL DESIGN VALUE | UPPER LIMIT VALUE | SENSOR S | SENSOR L |
| A3 | D2 | D6 | D9 | ON | ON |
| A4 | D2 | D6 | D9 | ON | OFF |
| B5 | AB | AE | B2 | OFF | OFF |
| B4 | AB | AE | B2 | ON | ON |
| A4R | 7D | 80 | 84 | ON | ON |
| A5 | 7D | 80 | 84 | OFF | OFF |
| B5R | 61 | 65 | 69 | ON | OFF |
| A5R | 40 | 44 | 47 | OFF | OFF |
| A6R | 16 | 1A | 1D | OFF | OFF |

IMAGE FORMING APPARATUS

BACKGROUND OF THE INVENTION

1. Field of the Invention

The present disclosure relates to an image forming apparatus.

2. Description of the Related Art

In a conventional general image forming apparatus, presence/absence of a sheet (for example, a paper) is detected by a transmission-type sensor and its light shielding flag. In this arrangement, presence/absence of sheet is detected when the transmission-type sensor respectively switches between light transmitting/light shielding with an operation of the light shielding flag. In this method, however, it is likely that, depending on a size of the light shielding flag, the sheet cannot correctly be detected in a case where an edge of sheet is not in contact with the sheet tray due to, for example, the sheet placed on the sheet tray which is folded or curled.

Then, at the portion of the sheet tray where occurrence of such problem is concerned, reflection-type sensor (for example, long distance type reflection-type sensor, blank sheet detection distance of which is more than or equal to 20 [mm]) is used to allow detection of the sheet even the "paper curl" is caused. The sensor of this type irradiates light on a target from light emitting element to detect reflected light. The presence/absence or size of the sheet is detected in this manner so that distance which is detectable depends on light amount of the light emitting element. In general, light emitting diode (LED) used as the light emitting element has a feature that the longer accumulated lighting time of the LED gets, the less amount the LED emit lights. Further, as compared to the transmission-type sensor, the long distance type sensor emits a larger amount of light. Thereby, due to aged deterioration, the light amount of the LED rapidly reduces. Thus, to suppress deterioration of the LED of the reflection-type sensor, it is necessary to minimize the lighting time of the LED.

For example, Japanese Patent Application Laid-open No. 2003-182886 discloses a device in which the reflection-type sensor as mentioned is employed as a sensor on an original tray of an automatic document feeder. Also, in the device, the light emitting element is turned on just before feeding operation is started to detect length of the original and the light emitting element is turned off after the detection.

Besides the automatic document feeder, a portion at which wrong detection, caused by the sheet curl, is concerned in the image forming apparatus includes a manual feed tray. In the following, the difference of sheet size detection mechanism between the automatic document feeder and the manual feed tray is described.

In case of the automatic document feeder, it is less likely that the sheet is intentionally left. The original is placed on the original tray just before reading operation of the original is started. When the reading of the original is finished, no original is left on the original tray. That is, it is less likely that the original is left on the original tray for a long time. On the other hand, in case of the manual feed tray, a special sheet, which cannot be fed from a sheet feeding cassette, sometimes remains set intentionally on the manual feed tray. The special sheet includes postcard, envelope, etc. Due to this, it is highly likely that the sheet is left on the manual feed tray for a long time. For example, it is assumed that the image forming apparatus is switchable between a normal power mode and a power saving mode. In the normal power mode, normal power is supplied for performing image formation. In the power saving mode, less power is consumed as compared to the power consumed in the normal power mode. In a case where the sheet is already set on the manual feed tray when returning from the power saving mode, sheet size is detected immediately after the return by a sheet size sensor having a LED. Thereby, every time the image forming apparatus returns from the power saving mode, the LED of the sheet size sensor is turned on. This results in rapid progression of deterioration of the LED of the sheet size sensor so that the detection distance is reduced, which increases the possibility that the sheet size is wrongly detected, which is a problem. The main object of the present disclosure is to provide an image forming apparatus which can control the turning-on of the light emitting element according to a state of the sheet on the manual feed tray.

SUMMARY OF THE INVENTION

According to the present disclosure, an image forming apparatus which is switchable between a first mode and a second mode, in the first mode, power is supplied for performing image formation, and in the second mode, less power is consumed as compared to the power consumed in the first mode, comprising: a manual feed tray on which a sheet is placed, a first detection unit configured to detect presence/absence of the sheet on the manual feed tray; a second detection unit, including light emitting element and light receiving element, configured to detect reflected light which is irradiated from the light emitting element by the light receiving element and to detect an approximate sheet length of sheet placed on the manual feed tray in a conveying direction; and a control unit configured to control not to turn on the light emitting element when the image forming apparatus is switched to the first mode in a case where a factor to switch the mode from the second mode to the first mode is a factor other than detection of sheet by the first detection unit.

Further features of the present invention will become apparent from the following description of exemplary embodiments (with reference to the attached drawings).

DESCRIPTION OF THE EMBODIMENTS

In the following, an embodiment is described with reference to the accompanying drawings.

Figure 1:
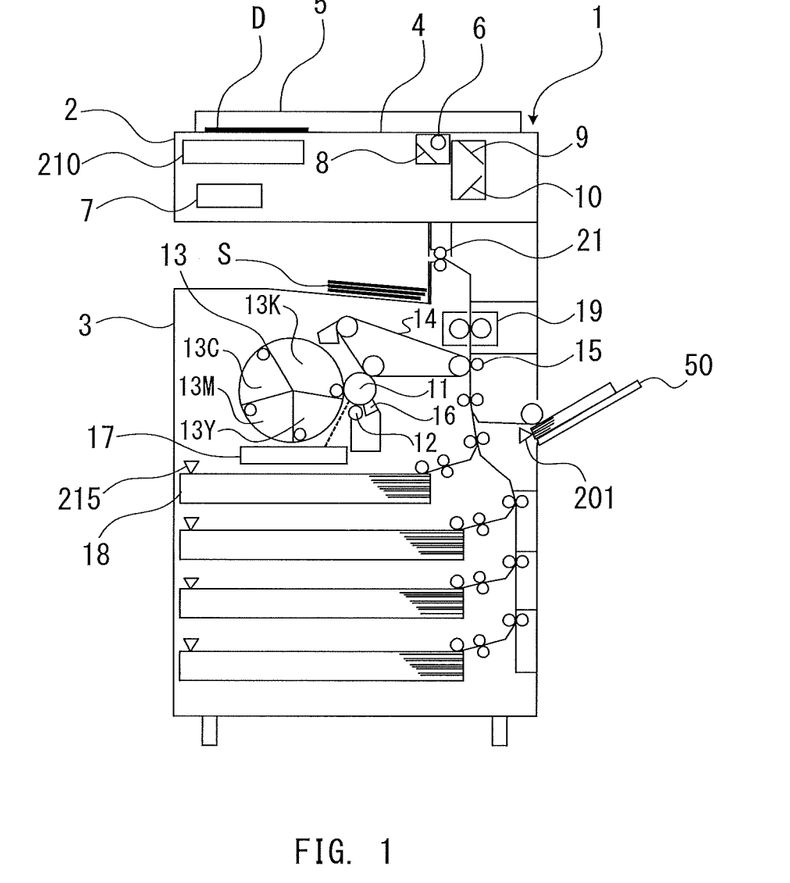
FIG. 1 is a schematic longitudinal sectional view illustrating an example of an image forming apparatus according to the present embodiment.

FIG. 1 is a schematic longitudinal sectional view illustrating an example of an image forming apparatus according to the present embodiment. As shown in FIG. 1, the image forming apparatus 1 comprises an image reading section 2 for reading an original and an image forming section 3 for performing image formation. A platen 4, comprising a transparent glass board which is fixedly provided, is arranged on top of the image reading section 2 viewed from front. An original D, placed at a predetermined position on the platen 4 with its image surface oriented downward, is pressed and fixed with an original pressing plate 5. Also, an optical system is provided on a lower side of the platen 4. The optical system includes a lamp 6 for illuminating the original D, and reflection mirrors 8, 9, and 10 for guiding an optical image of the illuminated original D to an image processing unit 7. It is noted that the lamp 6 and the reflection mirrors 8, 9, and 10 are driven by a motor (not shown), move at a predetermined speed to scan the original D.

The image forming section 3 comprises a photosensitive drum 11, a primary charging roller 12, developing unit 13, an intermediate transfer belt 14, a transfer roller 15, a cleaner 16 and the like. Based on image data, an optical image is irradiated from a laser unit 17 on the photosensitive drum 11. Then, an electrostatic latent image is formed on its surface. The primary charging roller 12 uniformly charges the surface of the photosensitive drum 11 before irradiating laser light. The developing unit 13 adheres magenta (M), cyan (C), yellow (Y), and black (K) toners to the electrostatic latent images formed on the surface of the photosensitive drum 11 to form toner images. The toner image having developed on the surface of the photosensitive drum 11 is transferred to the intermediate transfer belt 14. The toner image having transferred to the intermediate transfer belt 14 is further transferred to a sheet S (for example, paper) by the transfer roller 15. The cleaner 16 removes the toners remaining on the photosensitive drum 11 after transferring the toner images.

The sheet is supplied from a sheet cassette or a manual feed tray 50. A fixing device 19 is provided on a downstream side of the image forming section 3. The fixing device 19 fixes the toner image on the sheet being conveyed. The sheet having the toner image fixed thereon is discharged from the image forming apparatus 1 through the delivery roller pair 21.

In each sheet cassette 18, a sheet cassette open/close sensor 215 for detecting opening and closing of the respective sheet cassettes and a sheet size sensor (not shown) for detecting a size of sheet stored in the sheet cassette are provided. Also, it is configured to automatically detect the size of sheet based on the output of the sheet size sensor when the sheet feeding cassette is closed. A manual sheet feeding sensor 201 is provided on the manual feed tray 50. The manual sheet feeding sensor 201 detects presence/absence of the sheet on the manual feed tray 50. The manual sheet feeding sensor 201 functions as a first detection unit. In a case where the sheet is detected by the manual sheet feeding sensor 201, a screen to prompt a user to set the sheet size of sheet placed on the tray is displayed on a display screen of an operation unit 210. The user sets the sheet size according to the contents of the screen displayed on the operation unit 210. In this manner, the image forming apparatus 1 can identify the size of sheet placed on the manual feed tray 50.

Also, the image forming apparatus 1 is configured to be switchable between normal power mode (first mode) and power saving mode (second mode). In the normal power mode, normal power is supplied for performing image formation. In the power saving mode, less power is consumed as compared to the power consumed in the normal power mode. It means that, as the power mode, the image forming apparatus has the normal power mode and the power saving mode. In the normal power mode, the image forming apparatus 1 stands by a start of image formation while keeping supplying power to each load to allow immediate execution of received jobs such as copying, printing, etc. Thereby, power consumption is large. On the other hand, in the power saving mode, the image forming apparatus 1 stands by with some functions activated, including function to receive operation of the operation unit 210, and function to receive job such as receiving facsimile through the network while turning off the power supply to each load, which is unnecessary, other than the above. Thereby, as compared to the power consumed in the normal power mode, smaller power is consumed in the power saving mode. By setting time to stand by in the power saving mode as long as possible, the power consumption of the image forming apparatus 1 can be more reduced.

It is noted that switching of the power mode from the normal power mode to the power saving mode can be made at an arbitrary timing by pressing, by the user, a predetermined key provided on the operation unit 210. Further, the image forming apparatus 1 may be configured to automatically switch the power mode from the normal power mode to the power saving mode after a lapse of a predetermined time without any new print instruction or operation from the end of printing or the end of user's operation.

Figure 2:
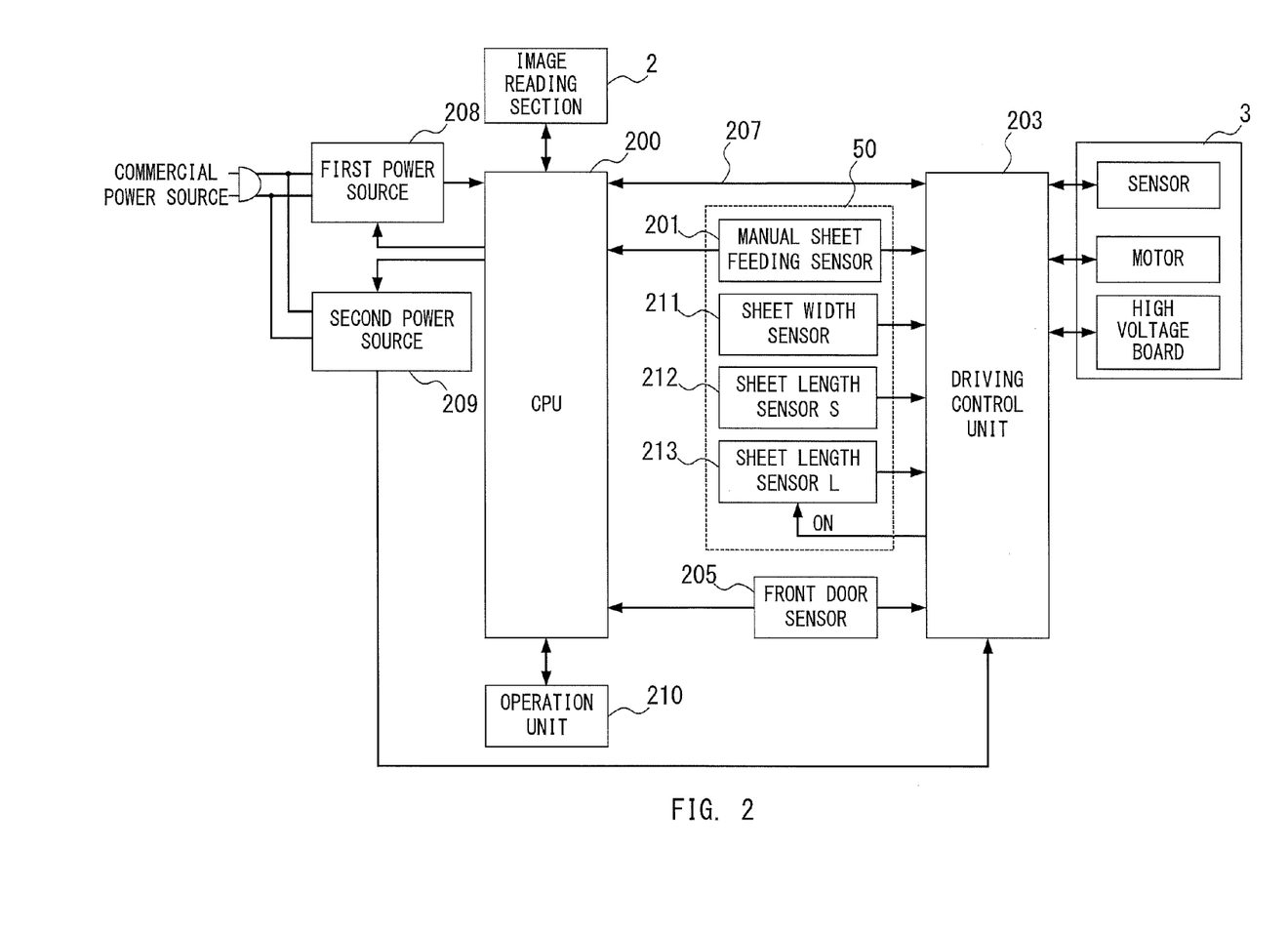
FIG. 2 is a block diagram illustrating an example of functional configuration of the image forming apparatus.

FIG. 2 is a block diagram illustrating an example of functional configuration of the image forming apparatus 1. A main control unit (CPU: Central Processing Unit) 200 mainly controls operation of the image reading section 2, operation unit 210 and driving control unit 203. The main control unit 200 mainly has a role of image processing function. It is noted that power is supplied to the main control unit 200 from a first power source 208 when its power supply function is turned on when the image forming apparatus 1 is in both the normal power mode and power saving mode. On the other hand, the driving control unit 203 mainly controls the image forming section 3. Based on an instruction from the main control unit 200, the driving control unit 203 performs electrophotographic process and sheet conveyance control. Also, the driving control unit 203 has a role of forming images on the sheet based on the information having the images processed by the main control unit 200. Power is supplied to the driving control unit 203 from a second power source 209 when its power supply function is turned on when the image forming apparatus 1 is in the normal power mode. It is noted that, in the power saving mode, the power supply function of the second power source 209 is turned off.

As mentioned, when the image forming apparatus 1 is in the power saving mode, the main control unit 200 is operable, which enables to monitor a state of input signals etc. The driving control unit 203, however, is not operable when the image forming apparatus 1 is in the power saving mode, which makes it impossible to monitor a state of input signals etc. The main control unit 200 controls switching of ON/OFF of the power supply function of the first power source 208 and the second power source 209. Due to this, the main control unit 200 switches the image forming apparatus 1 to the normal power mode or power saving mode. For example, when the user performs an operation to switch to the normal power mode or power saving mode through the operation unit 210, the control unit 200 controls the first power source 208 and the second power source 209 according to the contents of the operation. Also, a front door sensor 205 detects a state of a front door which opens and closes for replacing consumables etc. in the apparatus. Power is supplied to the manual sheet feeding sensor 201 of the manual feed tray 50 and to the front door sensor 205 from the first power source 208. Thereby, even the image forming apparatus 1 is in the power saving mode, state change of the apparatus (for example, placement of sheet on the manual feed tray, open/close of the front door) can be detected.

In a case where it is detected that a state of the manual sheet feeding sensor 201 is changed from "sheet absent" to "sheet present", the main control unit 200 switches the state of the image forming apparatus 1 from the power saving mode to the normal power mode. Also, in a case where it is detected that a state of the front door sensor 205 is changed from "door closed state" to "door opened state", the main control unit 200 switches the state of the image forming apparatus 1 from the power saving mode to the normal power mode. It is noted that the state of the image forming apparatus 1 can be switched from the power saving mode to the normal power mode by, for example, pressing down a power saving key provided on the operation unit 210. Also, the act of switching from the power saving mode to the normal power mode is referred to as "return".

Further, in a case where a print job is input to the image forming apparatus 1 through network, the image forming apparatus 1 is automatically switched from the power saving mode to the normal power mode accordingly. Also, the main control unit 200 and the driving control unit 203 are configured to transfer and receive information through a communication line 207 so that if the image forming apparatus 1 is in the normal power mode, various information can reciprocally be transmitted and received. The output signals from the manual sheet feeding sensor 201 and the front door sensor 205 are also input to the driving control unit 203. Thereby, the driving control unit 203 can detect a state of each sensor when starting up the image forming apparatus 1.

Figure 7:
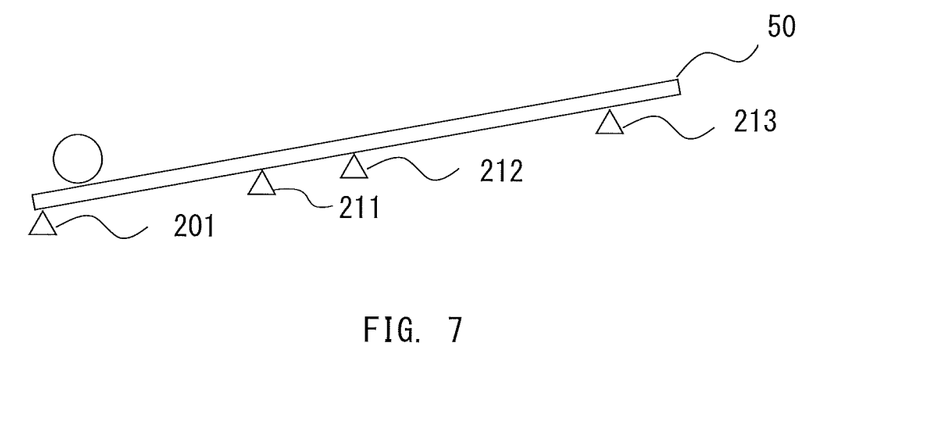
FIG. 7 is a cross sectional view of the manual feed tray.

Here, a description is given in detail with regard to the arrangement of the manual feed tray 50 with FIG. 7. The manual sheet feeding sensor 201 and a sheet width sensor 211, a sheet length sensor S 212, and a sheet length sensor L 213 for detecting a sheet size are arranged on the manual feed tray 50. The sheet width sensor 211 for detecting the sheet width outputs the sheet width in a direction which is vertical to sheet conveying direction as analog signals. Based on the output result, the sheet width is detected. For example, this is achieved with a variable resistor. The sheet length sensor S 212 and the sheet length sensor L 213 for detecting the sheet length are the sensors arranged with fixed intervals to the conveying direction of the respective sheets. Each sensor outputs presence/absence of the sheet as digital signals. Based on the output result, approximate sheet length is detected. It is noted that when it is not necessary to distinguish the sheet length sensor S 212 from the sheet length sensor L 213, the sensors are referred to as the sheet length sensor. The sheet length sensor functions as a second detection unit. With a combination of the detection result obtained from these three sensors, the sheet size is determined. In the following, a particular description is given with FIG. 3.

Figure 3:
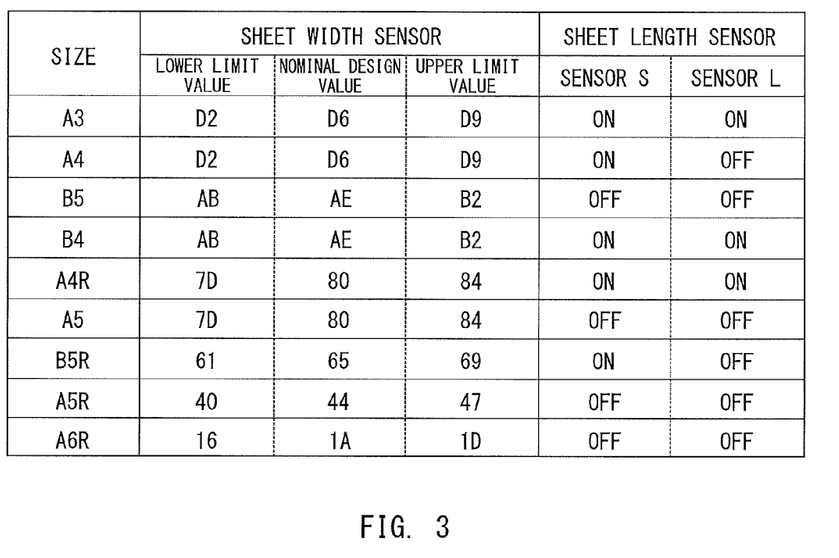
FIG. 3 is a table showing the relation between the sensor detection result and the sheet size.

FIG. 3 is a table showing the relation between the detection result obtained from the sensors and the sheet size. As shown in FIG. 3, in the case of A3 sheet and A4 sheet, the same values (D2, D6, D9) are obtained from the sheet width sensor 211. However, the sheet length sensor L 213 is configured to detect the sheet of large size, i.e., configured to detect (turn ON) only when the sheet is A3 sheet, which enables to distinguish A3 sheet from A4 sheet. It means that the sheet length sensor L 213 functions as a detection unit which detects that the sheet length in the conveying direction exceeds predetermined length.

Back to the description of FIG. 2, the larger the sheet size, the more likely that the "sheet curl" of sheet placed on the manual feed tray 50 occurs. To cope with this, in the present embodiment, the sheet length sensor L 213 for detecting the sheet of large size is employed as a reflection-type sensor. This is because the reflection-type sensor is capable of detecting the sheet of large size even if the sheet curl occurs. The reflection-type sensor includes, for example, a light emitting element and a light receiving element. The reflection-type sensor detects reflected light of the light irradiated from the light emitting element by the light receiving element. In this case, power supply to the sheet length sensor L 213 is turned ON/OFF by the driving control unit 203 and power can be supplied to the reflection-type sensor depending on a situation. It is noted that, depending on a structure of the manual feed tray 50, parts at which the "sheet curl" is likely to occur vary. Thereby, the sheet length sensor S 212 can be employed as the reflection-type sensor. Also, both the sheet length sensor S 212 and the sheet length sensor L 213 can be employed as the reflection-type sensor.

Figure 4:
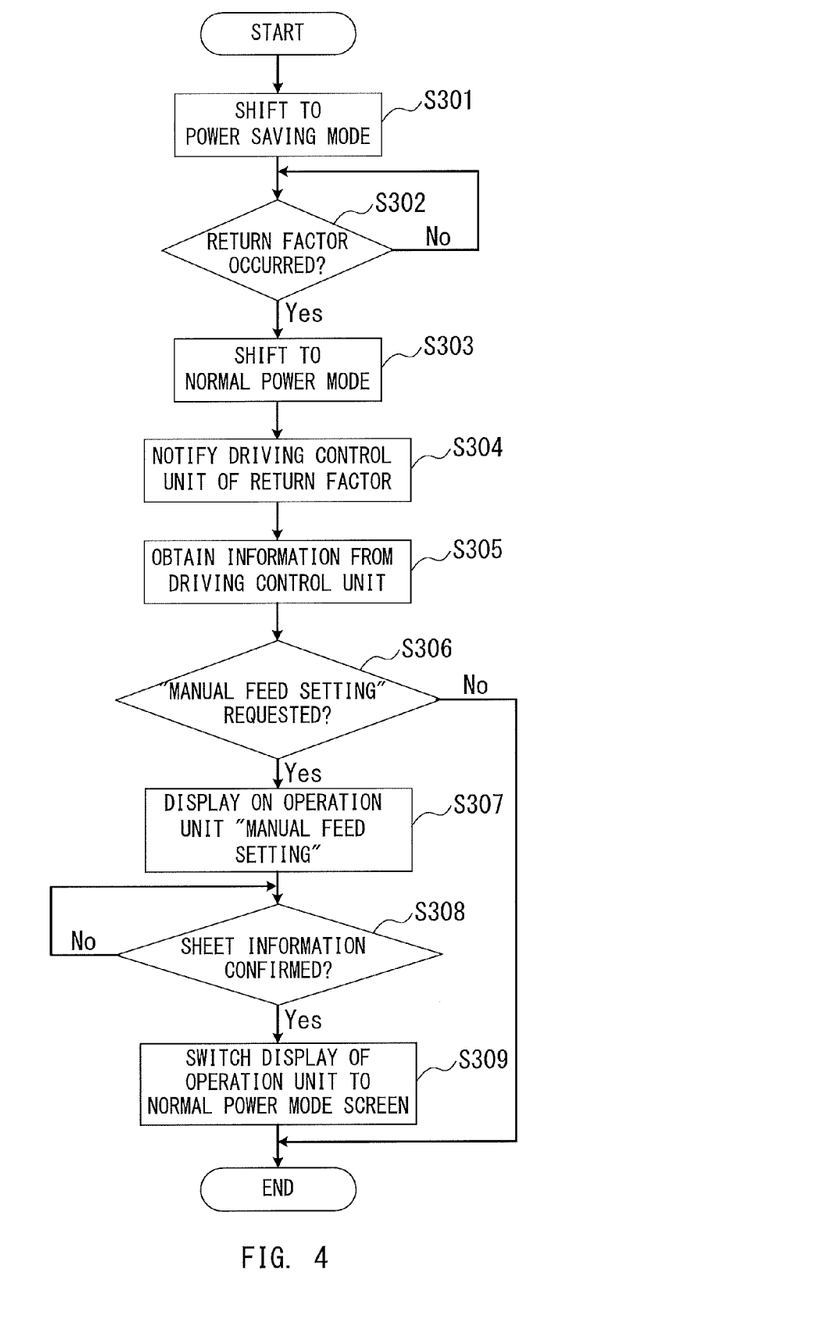
FIG. 4 is a flowchart showing an example of the control procedure performed by a main control unit.
Figure 5:
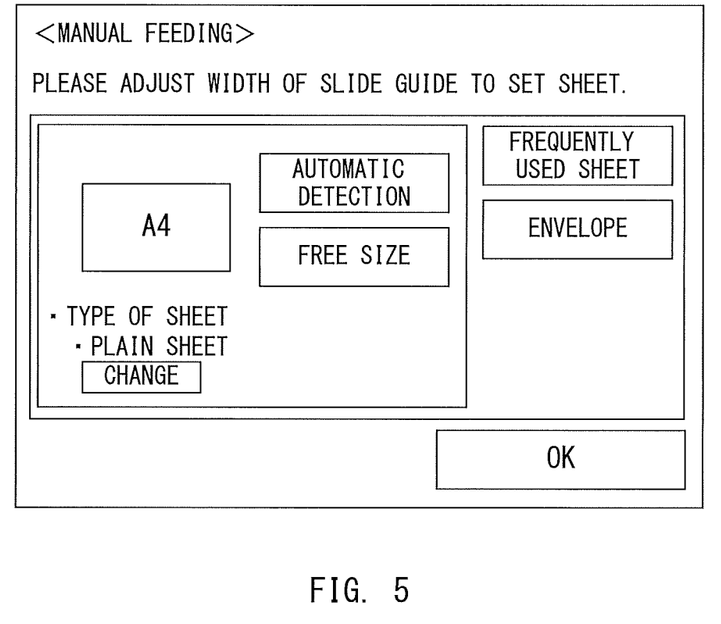
FIG. 5 is a diagram illustrating an example of setting screen of sheet placed on the manual feed tray.
Figure 6:
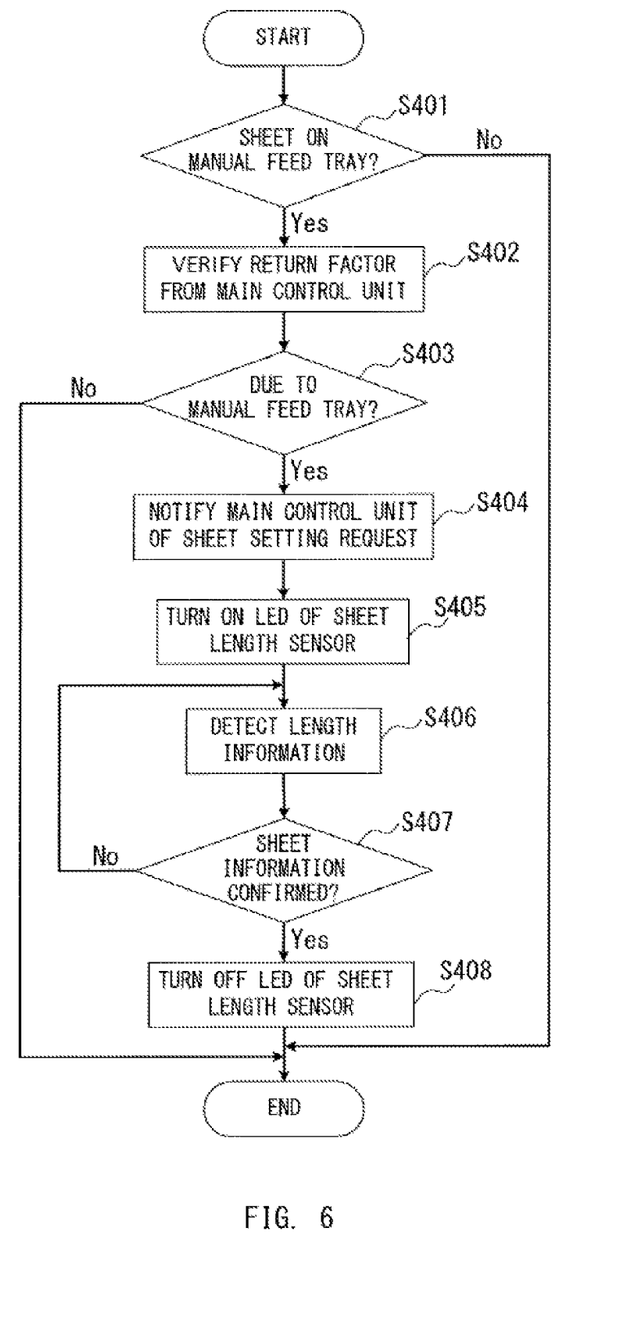
FIG. 6 is a flowchart showing an example of the control procedure performed by a driving control unit based on an instruction from the main control unit.

Next, a description is given with regard to a control procedure of the main control unit 200 and the driving control unit 203 in the case where the image forming apparatus 1 in the power saving mode detects the sheet placed on the manual feed tray 50 and switches to the normal power mode with FIGS. 4, 5, and 6. FIG. 4 is a flowchart showing an example of the control procedure mainly performed by the main control unit 200. FIG. 5 is a diagram illustrating an example of setting screen of sheet placed on the manual feed tray 50. FIG. 6 is a flowchart showing an example of the control procedure performed by the driving control unit 203 based mainly on an instruction from the main control unit 200.

In response to a lapse of a predetermined time without any new print instruction or user's operation from the end of printing processing or the end of user's operation, the main control unit 200 switches the power mode of the image forming apparatus 1 from the normal power mode to the power saving mode (S301). The main control unit 200 stands by until a factor (return factor) to switch power mode from the power saving mode to the normal power mode occurs (S302). If it is determined that the return factor occurs (S302: Y), the main control unit 200 shifts the power mode of the image forming apparatus 1 from the power saving mode to the normal power mode (S303). It means that, to enable the image formation, a power supply to the driving control unit 203 is allowed.

Here, when the image forming apparatus 1 shifts to the normal power mode, power is supplied to the driving control unit 203. Thereby, the main control unit 200 enters a state in which communication with the driving control unit 203 is allowed. The main control unit 200 notifies the driving control unit 203 of the information relating to the return factor, for example, the information representing that a new sheet is placed on the manual feed tray 50, representing that an open/close sensor is activated, or representing some other factor such as a user pressing a control key (S304). Also, the main control unit 200 obtains the information to be notified from the driving control unit 203 (S305). The main control unit 200 determines whether the information obtained from the driving control unit 203 is the information including manual feed setting request for sheet information relating to the sheet placed on the manual feed tray 50 or not. If it is determined that the information includes the setting request for sheet information (S306: Y), the main control unit 200 causes the display screen of the operation unit 210 to display a manual feed setting screen (described later) to prompt the user to set the sheet information (S307). The user is prompted to set the sheet information because the information relating to the sheet placed on the manual feed tray 50 (for example, sheet size, and sheet type) is unknown. This is because the driving control unit 203 is yet to confirm the information relating to the sheet placed on the manual feed tray 50. In the following, a description is given with regard to the manual feed setting screen with FIG. 5.

FIG. 5 is a diagram illustrating an example of the manual feed setting screen displayed on the display screen of the operation unit 210. For example, if A4 size sheet is placed on the manual feed tray 50 by the user, the sheet size is automatically identified by the size detecting method as mentioned. FIG. 5 shows a case where the sheet size of A4 size is identified. Thereafter, the user checks the sheet size displayed on the manual feed setting screen, selects type of sheet etc., on the screen, and then, presses "OK" button located right below of the screen. In this manner, the sheet information (sheet information) such as the sheet size is confirmed.

Back to the description of FIG. 4, the main control unit 200 continues displaying the manual feed setting screen until the sheet information is confirmed by the user (S308). Then, when the sheet information is confirmed, the main control unit 200 switches the screen display from the manual feeding setting screen to the screen of the normal power mode (S309). On the other hand, if it is determined that the obtained information includes no setting request for the sheet information (S306: N), the main control unit 200 ends a series of processing.

Also, as shown in FIG. 6, in response to the return of the image forming apparatus 1 from the power saving mode to the normal power mode, the driving control unit 203 determines whether or not any sheet is placed on the manual feed tray 50 based on the output signals from the manual sheet feeding sensor 201 (S401). If it is determined that no sheet is placed on the manual feed tray 50 (S401: N), the driving control unit 203 ends the processing. If not, i.e., if it is determined that a sheet is placed on the manual feed tray 50 (S401: Y), the driving control unit 203 verifies notification of information relating to the return factor from the main control unit 200 through the processing of step S304 (FIG. 4) (S402). Based on the information notified from the main control unit 200, the driving control unit 203 determines whether or not the return factor is actually due to the detection of the new sheet on the manual feed tray 50 (S403).

If it is determined that the return factor is not derived from the detection of the new sheet (S403: N), the driving control unit 203 ends the processing. If not, i.e. if it is determined that the return factor is the detection of the new sheet (S403: Y), it is considered that the sheet detected on the manual feed tray 50 is not the sheet which is placed before the image forming apparatus switches from the normal power mode to the power saving mode, but the sheet which is newly placed on the manual feed tray 50. In this case, the driving control unit 203 notifies the main control unit 200 of the determination result (S404). The processing corresponds to the processing of Step S305 (FIG. 4). The driving control unit 203 notifies the main control unit 200 of the information including the setting request of sheet.

The driving control unit 203 turns on the LED of the sheet length sensor (S405) and detects the sheet size of the sheet newly set on the manual feed tray 50 (S406). The driving control unit 203 determines whether or not the sheet setting is confirmed by the user (S407). It is noted that the driving control unit 203 continues detecting the sheet size until the sheet setting is completed by the user. If the sheet setting is confirmed by the user (S407: Y), the driving control unit 203 turns off the LED of the sheet length sensor (S408) and ends a series of processing.

As mentioned, the image forming apparatus 1 according to the present embodiment identifies the return factor by which the image forming apparatus returns from the power saving mode to the normal power mode in a case where the sheet is placed on the manual feed tray 50. Then, the image forming apparatus 1 controls turning-on of the LED or maintains turning-off of the LED of the sheet length sensor depending on the return factor identified. For example, if the return factor is the detection of a new sheet on the manual feed tray 50, the image forming apparatus 1 turns on the LED of the sheet length sensor. Also, if the return factor is a factor other than the detection of the sheet on the manual feed tray 50, for example, if it is a change from "door opened" to "door closed", the image forming apparatus 1 maintains the turning-off state of the LED. Due to this, it becomes possible to minimize the time to turn on the LED, which reduces wrong detection of the sheet size caused by the deterioration of the LED.

As mentioned, according to the present disclosure, by controlling the turning-on of the light emitting element depending on the state of the sheet on the manual feed tray when returning from the power saving mode, deterioration of the light emitting element can be suppressed. The present invention has been described in detail by way of the above-mentioned embodiments, but the scope of the present invention is not limited to those embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese patent application No. 2014-248182, filed Dec. 8, 2014, which is hereby incorporated by reference wherein in its entirety.

What is claimed is:

1. An image forming apparatus which is switchable between a first mode and a second mode, in the first mode, power is supplied for performing image formation, and in the second mode, less power is consumed as compared to the power consumed in the first mode, comprising:
 a manual feed tray on which a sheet is placed;
 a first detection unit configured to detect presence/absence of any sheet on the manual feed tray;
 a second detection unit, including light emitting element and light receiving element, configured to detect reflected light which is irradiated from the light emitting element by the light receiving element and to detect an approximate sheet length of sheet placed on the manual feed tray in a conveying direction; and
 a control unit configured to control not to turn on the light emitting element when the image forming apparatus is switched to the first mode in a case where a factor to switch the mode to the first mode is a factor other than detection of a newly placed sheet on the manual feed tray by the first detection unit.

2. The image forming apparatus according to claim 1, wherein the control unit is further configured to control to turn on the light emitting element in a case where a factor to switch the mode from the second mode to the first mode is detection of the newly placed sheet by the first detection unit.

3. The image forming apparatus according to claim 2, further comprising
a sensor configured to detect opening and closing of a door included in the image forming apparatus,
wherein the control unit is further configured to control to turn on the light emitting element in a case where a factor to switch the mode from the second mode to the first mode is detection of change of the door from a door opened state to a door closed state.

4. The image forming apparatus according to claim 2,
wherein the control unit is further configured to allow power to be supplied to an image forming section which performs image formation in a case where the mode is switched from the second mode to the first mode.

5. The image forming apparatus according to claim 1,
wherein the second detection unit comprises a plurality of sensors including the light emitting element and the light receiving element, and
wherein the plurality of sensors are arranged in the sheet conveying direction and each sensor outputs signals indicating presence/absence of the sheet.

6. The image forming apparatus according to claim 1, further comprising a display unit configured to display a setting screen of sheet information including a size and type of the sheet,
wherein the control unit is further configured to control to display the setting screen on the display unit in a case where a factor to switch the mode from the second mode to the first mode is detection of the newly placed sheet on the manual feed tray by the first detection unit.

7. The image forming apparatus according to claim 6,
wherein the control unit is further configured to control to continue displaying the setting screen and detecting the sheet by the second detection unit until setting of the sheet information is completed.

8. The image forming apparatus according to claim 1,
wherein the second detection unit is further configured to detect that a sheet length in a conveying direction exceeds a predetermined length.

9. The image forming apparatus according to claim 8,
wherein the second detection unit further comprises a first sensor section and a second sensor section configured to detect an approximate sheet length in the conveying direction, and
wherein the second sensor section is configured to detect that sheet length in a conveying direction exceeds predetermined length.

10. The image forming apparatus according to claim 9,
wherein the second sensor section is configured to detect that the sheet length in the conveying direction has a length larger than the length of A4 size sheet.

11. The image forming apparatus according to claim 9,
wherein the first sensor section is configured to detect that the sheet length has a length smaller than the length of A4 size sheet.

* * * * *